US010938821B2

(12) United States Patent
Rao et al.

(10) Patent No.: US 10,938,821 B2
(45) Date of Patent: Mar. 2, 2021

(54) REMOTE ACCESS CONTROLLER SUPPORT REGISTRATION SYSTEM

(71) Applicant: Dell Products L.P., Round Rock, TX (US)

(72) Inventors: Sanjay Rao, Austin, TX (US); Divya Vijayvargiya, Cedar Park, TX (US)

(73) Assignee: Dell Products L.P., Round Rock, TX (US)

( * ) Notice: Subject to any disclaimer, the term of this patent is extended or adjusted under 35 U.S.C. 154(b) by 94 days.

(21) Appl. No.: 16/176,754

(22) Filed: Oct. 31, 2018

(65) Prior Publication Data

US 2020/0137062 A1    Apr. 30, 2020

(51) Int. Cl.
| | |
|---|---|
| G06F 15/16 | (2006.01) |
| H04L 29/06 | (2006.01) |
| H04W 4/20 | (2018.01) |
| H04L 29/08 | (2006.01) |

(52) U.S. Cl.
CPC ........ *H04L 63/101* (2013.01); *H04L 67/1031* (2013.01); *H04L 67/125* (2013.01); *H04W 4/20* (2013.01)

(58) Field of Classification Search
CPC . H04L 63/101; H04L 67/1031; H04L 67/125; H04L 63/10; H04L 12/2818; H04L 12/2856; H04L 12/2858; H04L 29/06823; H04L 41/0293; H04W 4/20
USPC ....................................... 709/228, 229, 227
See application file for complete search history.

(56) References Cited

U.S. PATENT DOCUMENTS

| 7,089,307 B2* | 8/2006 | Zintel ................ H04L 12/2803 709/203 |
| 7,130,895 B2* | 10/2006 | Zintel ................ H04L 12/2805 709/220 |
| 10,771,468 B1* | 9/2020 | Walker .................... G06F 21/62 |
| 2002/0029276 A1* | 3/2002 | Bendinelli .......... H04L 12/4641 709/227 |

(Continued)

OTHER PUBLICATIONS

Robert Sheldon, "Explore Options for Automatic Device," 2003-2018, 7 Pages, https://searchmobilecomputing.techtarget.com/tip/Explore-options-for-automatic-device-enrollment.

(Continued)

*Primary Examiner* — Thu Ha T Nguyen
(74) *Attorney, Agent, or Firm* — Haynes and Boone, LLP

(57) ABSTRACT

A remote access controller support system includes a second server device that includes a second remote access controller that is coupled to a support system through an out-of-band network and coupled to a first remote access controller through a remote access controller network. The second server device registers and enrolls, using the second remote access controller and via communications through the out of-band-network, the second remote access controller with the support system by providing a second service tag. The second server device retrieves, using the second remote access controller and via communications with the first remote access controller through the remote access controller network, a first service tag from the first remote access controller and provides, using the second remote access controller and through the out of-band-network, the first service tag to the support system to enroll the first remote access controller with the support system.

18 Claims, 4 Drawing Sheets

(56) References Cited

U.S. PATENT DOCUMENTS

| | | | | |
|---|---|---|---|---|
| 2002/0056008 | A1* | 5/2002 | Keane | H04L 61/00 709/245 |
| 2002/0091859 | A1* | 7/2002 | Tuomenoksa | H04L 12/4641 709/245 |
| 2002/0099937 | A1* | 7/2002 | Tuomenoksa | H04L 12/4641 713/153 |
| 2003/0055877 | A1* | 3/2003 | Williams | H04L 67/02 709/203 |
| 2008/0281716 | A1* | 11/2008 | Nagoya | G06Q 30/0601 705/26.1 |
| 2010/0217837 | A1* | 8/2010 | Ansari | H04L 67/16 709/218 |
| 2012/0042392 | A1* | 2/2012 | Wu | H04L 63/102 726/28 |
| 2012/0117183 | A1* | 5/2012 | Wong | H04L 63/104 709/217 |
| 2012/0166548 | A1* | 6/2012 | Gropper | G06Q 30/02 709/205 |
| 2012/0239221 | A1* | 9/2012 | Mighdoll | H04L 63/10 700/300 |
| 2013/0124546 | A1* | 5/2013 | Wormley | G06F 21/6236 707/758 |
| 2013/0305345 | A1* | 11/2013 | Bugenhagen | H04W 4/70 726/12 |
| 2014/0204803 | A1* | 7/2014 | Nguyen | H04L 41/5054 370/255 |
| 2015/0087278 | A1* | 3/2015 | Kim | G06F 21/335 455/414.1 |
| 2015/0327073 | A1* | 11/2015 | Rommer | H04W 60/02 455/410 |
| 2016/0226732 | A1* | 8/2016 | Kim | H04W 12/04031 |
| 2016/0261600 | A1* | 9/2016 | Bae | H04L 9/3226 |
| 2016/0366183 | A1* | 12/2016 | Smith | H04L 63/101 |
| 2016/0366188 | A1* | 12/2016 | Smith | H04L 63/205 |
| 2017/0099647 | A1* | 4/2017 | Shah | H04W 12/0808 |
| 2017/0187703 | A1* | 6/2017 | Enrique Salpico | H04L 63/1458 |
| 2017/0318023 | A1* | 11/2017 | Seed | H04L 67/16 |
| 2017/0359423 | A1* | 12/2017 | Nadathur | H04L 65/4069 |
| 2017/0374071 | A1* | 12/2017 | Visuri | H04W 12/06 |
| 2018/0007059 | A1* | 1/2018 | Innes | H04L 63/107 |
| 2018/0060393 | A1* | 3/2018 | Kalathuru | G06F 16/90335 |
| 2018/0129436 | A1* | 5/2018 | Standefer, III | H04W 12/08 |
| 2018/0131684 | A1* | 5/2018 | Standefer, III | H04L 63/104 |
| 2018/0349643 | A1* | 12/2018 | Kunjachan | G06Q 20/3827 |
| 2019/0014152 | A1* | 1/2019 | Verma | H04W 12/08 |
| 2019/0222988 | A1* | 7/2019 | Maes | H04L 41/5035 |
| 2019/0230063 | A1* | 7/2019 | McCready | H04L 63/02 |
| 2019/0289010 | A1* | 9/2019 | Yassour | G06K 7/1417 |
| 2020/0092271 | A1* | 3/2020 | Kumar | H04L 63/101 |
| 2020/0118127 | A1* | 4/2020 | Miller | G06Q 20/389 |

OTHER PUBLICATIONS

"Multiple Product Transfer," 2018, 1 Page, https://www.dell.com/support/assets-transfer/us/en/19/bulktransfer?Iwp=rt#/Download.

* cited by examiner

REMOTE ACCESS CONTROLLER SUPPORT REGISTRATION SYSTEM

BACKGROUND

The present disclosure relates generally to information handling systems, and more particularly to registering, using a remote access controller, an information handling system with a support system.

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems such as, for example, server devices, are often managed in order to update firmware, restore platforms, retrieve server event/error logs, retrieve or update boot configuration data, and/or provide for a variety of other server management activities known in the art. In conventional systems, server devices may include a remote access controller (e.g., a Dell Remote Access Controller (DRAC), an integrated DRAC (iDRAC) available from DELL® Inc. of Round Rock, Tex., United States, other Baseboard Management Controllers (BMCs) known in the art) that performs much of the management for the server device, and that may utilize management data (e.g., firmware image data, platform restore data, server event/error logs, boot configuration data, etc.) for performing a variety of out-of-band server management activities known in the art. In some situations, the remote access controller in a server device may need to register and enroll with a support system that communicates with the remote access controller in order to provide support for the server device such as, for example, detecting server errors and resolving those server errors via the remote access controller.

Registering and enrolling with the support system may require that the server device satisfy several conditions before the remote access controller registers and enrolls the server device with the support system. For example, the support system may require that the server device have an operating system installed, a remote access controller service module installed and running on the operating system, and/or a network connection that is established between the server device and the support system and that enables the remote access controller to communicate with the support system. While waiting for these conditions to be satisfied, as well as while waiting for the subsequent registration, the server device is unable to benefit from the support provided by the support system. In addition, there may be multiple server devices that are provided in a server rack, as well as multiple server racks that are deployed in a data center. As such, an administrator has to ensure that each server device satisfies the conditions for registering and enrolling with the support system, and then manually register and enroll each of those server devices before that server device can benefit from the support provided by the support system, which is time and labor intensive.

Accordingly, it would be desirable to provide an improved remote access controller support registration system.

SUMMARY

According to one embodiment, an Information Handling System (IHS) includes a first remote access controller, wherein the first remote access controller is coupled to a support system through an out-of-band network connection and coupled to the second remote access controller through a remote access controller network connection, and wherein the first remote access controller is configured to: register and enroll, via communications with the support system through the out of-band-network connection, the first remote access controller with the support system by providing the support system with a first service tag; retrieve, via communications with a second remote access controller through the remote access controller network connection, a second service tag from the second remote access controller; and provide, via communications with the support system through the out of-band-network connection, the second service tag to the support system to enroll the second remote access controller with the support system.

DETAILED DESCRIPTION

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Figure 1:
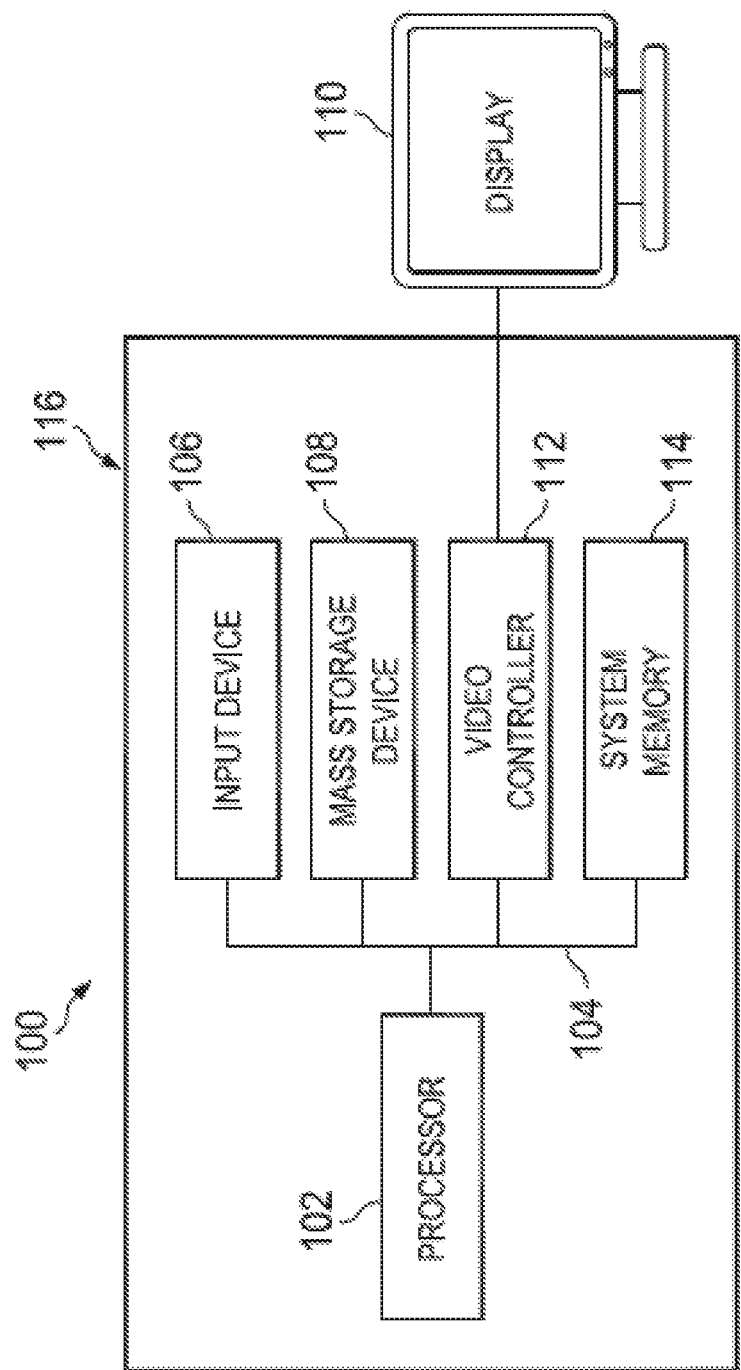
FIG. 1 is a schematic view illustrating an embodiment of an information handling system.

In one embodiment, IHS 100, FIG. 1, includes a processor 102, which is connected to a bus 104. Bus 104 serves as a connection between processor 102 and other components of IHS 100. An input device 106 is coupled to processor 102 to provide input to processor 102. Examples of input devices may include keyboards, touchscreens, pointing devices such as mouses, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. In an embodiment, a chassis 116 houses some or all of the components of IHS 100. It should be understood that other buses and intermediate circuits can be deployed between the components described above and processor 102 to facilitate interconnection between the components and the processor 102.

Figure 2:
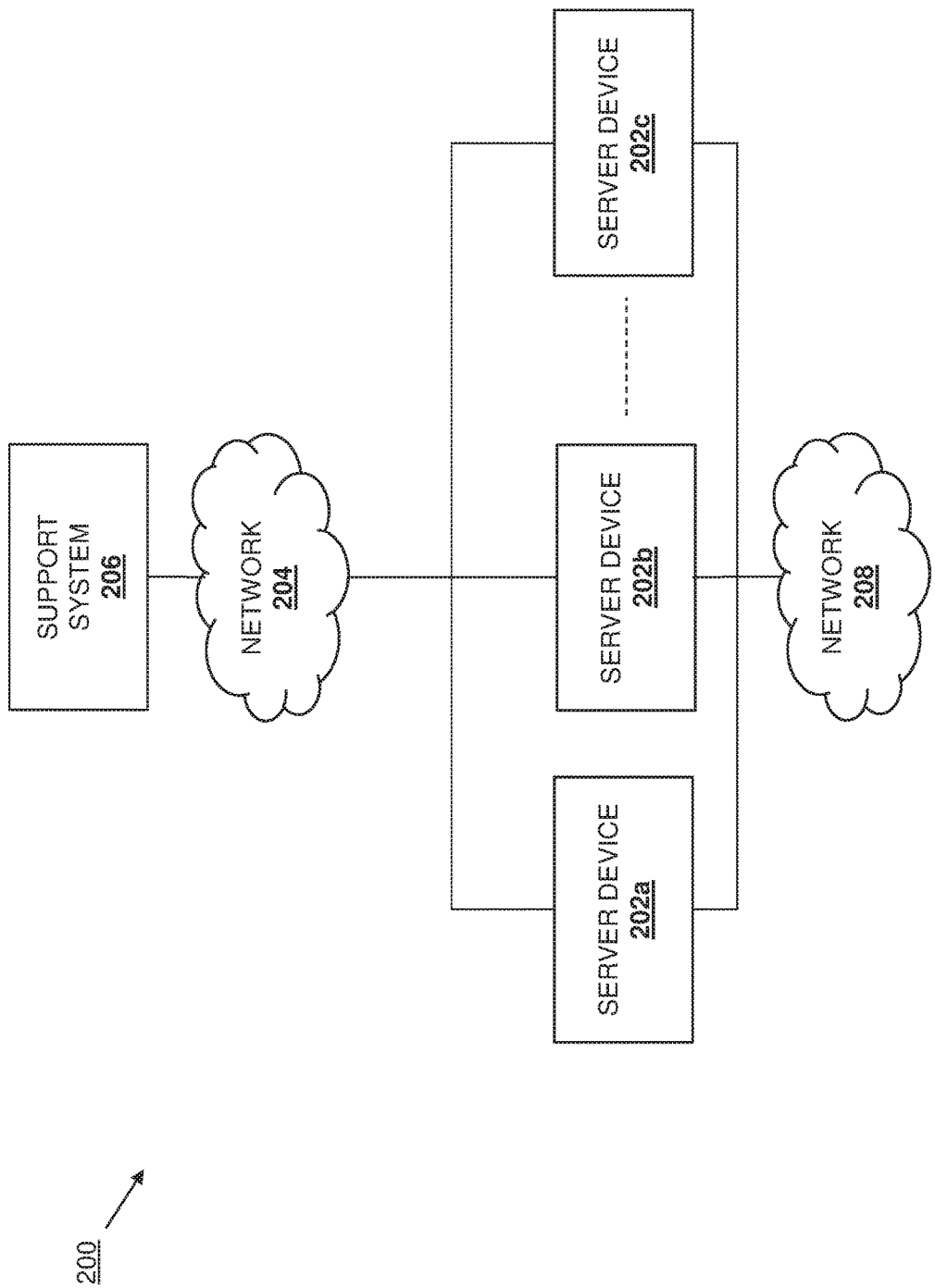
FIG. 2 is a schematic view illustrating an embodiment of a network including server devices coupled to a support system.

Referring now to FIG. 2, an embodiment of a network 200 is illustrated that may be utilized to perform the remote access controller support registration of the present disclosure. In the illustrated embodiment, the network 200 includes a plurality of server devices 202a, 202b, and up to 202c. Any or all of the server devices 202a-c may be provided by the IHS 100 discussed above with reference to FIG. 1, and/or may include some or all of the components of the IHS 100. However, while the computing devices that provide the remote access controller support registration of the present disclosure are illustrated and described below as server devices, one of skill in the art in possession of the present disclosure will recognize that other types of devices including networking devices, storage devices, desktop computing devices laptop/notebook computing devices, tablet computing devices, mobile phones, and/or other computing devices known in the art may require support and thus will benefit from the teachings of the present disclosure as well. Each of the server devices 202a-c may be coupled to a network 204 that may be provided by Local Area Networks (LANs), the Internet, and/or a variety of other networks that would be apparent to one of skill in the art in possession of the present disclosure. In addition, the server devices 202a-c may be coupled to a network 208 that may provide a remote access controller network, and that may include a private virtual LAN (VLAN) for the server devices 202a-c that allows the remote access controllers in server devices 202a-c to securely communicate with each other. A support system 206 is also coupled to the network 204, and may include one or more support devices (e.g., server devices and/or other computing devices) that are configured to provide the support for the server devices 202a-c discussed below. For example, the support system 206 may operate to provide SUPPORTASSIST® available from DELL® Inc. of Round Rock, Tex., United States. However, while a specific network 200 has been illustrated and described for performing the remote access controller support registration of the present disclosure, one of skill in the art in possession of the present disclosure will recognize that the registration of a server device with a support system using a remote access controller as described herein may be performed in a variety of networks while remaining within the scope of the present disclosure as well.

Figure 3:
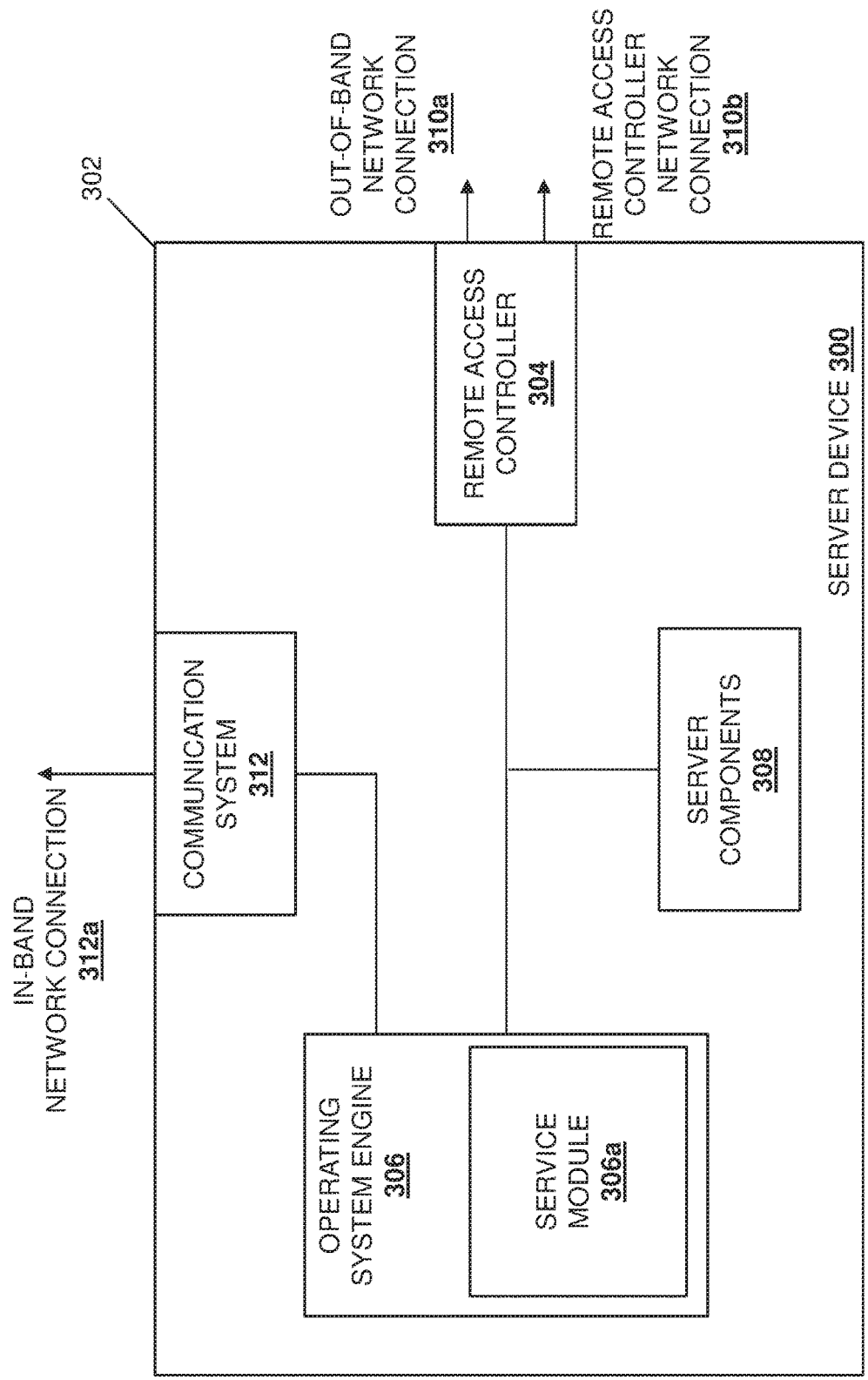
FIG. 3 is a schematic view illustrating a server device that may be provided in the network of FIG. 2.

Referring now to FIG. 3, an embodiment of a server device 300 is illustrated that may be any of the server devices 202a-c discussed above in the network 200 of FIG. 2, and that provides a specific example of the remote access controller support registration of the present disclosure. In the illustrated embodiment, the server device 300 includes a chassis 302 that houses the components of the server device 300, only some of which are illustrated in FIG. 3. For example, the chassis 302 may house a remote access controller 304 that may be provided by an integrated DELL® Remote Access Controller (iDRAC) available from DELL® Inc. of Round Rock, Tex., United States. However, one of skill in the art in possession of the present disclosure will recognize that the remote access controller 304 may be provided by a Baseboard Management Controller (BMC) and/or other components with similar functionality to that described below while remaining within the scope of the present disclosure as well. As would be understood by one of skill in the art in possession of the present disclosure, remote access controllers may provide an out-of-band management platform via, for example, a separate expansion card, or via functionality integrated into the main circuit board in the server device 300 (e.g., as with the iDRAC), and may include resources that are separate from the server device 300 and that may enable a browser-based interface and/or command line interface for managing and monitoring server components and/or other server functionality. For example, the iDRAC available from DELL® Inc. includes its own processing system, memory system, network connection, and access to the server device system bus, which enables power management, virtual media access, remote console capabilities, and other functionality that may all be available via a web browser or command-line interface, which gives system administrators the ability to configure the server device 300 as if they were sitting at a console local to the server device 300. As such, the remote access controller 304 may include an out-of-band network connection 310a to an administrator device (not illustrated) via the network 204, as well as one or more couplings to server components 308 (e.g., via a server device system bus) that may include a variety of server components that provide management data used by the support system and the remote access controller 304 as discussed below. The remote access controller 304 may also include a remote access controller network connection 310b to other remote access controllers that may be included in other server devices that are provided in a network, within a rack chassis, and/or otherwise as part of the remote access controller registration system of the present disclosure. As such, the remote access controller network connection 310b may be coupled to the network 204 and/or the network 208.

The chassis 302 may also house a processing system (not illustrated, but which may include the processor 102 discussed above with reference to FIG. 1) and a memory system (not illustrated, but which may include the memory 114 discussed above with reference to FIG. 1) that is coupled to the processing system and that includes instructions that, when executed by the processing system, cause the processing system to provide an operating system engine 306 that is configured to provide an operating system for the server device 300, as well as perform the other functionality discussed below.

In the illustrated embodiment, a service module 306a is included in the operating system engine 306 via, for example, instructions included on the memory system that, when executed by the processing system, cause the processing system to provide the service module 306a that is configured to perform the functions of the service modules discussed below. For example, the service module 306a may be provided by an integrated DELL® Remote Access Controller (iDRAC) service module (iSM) available from DELL® Inc. of Round Rock, Tex., United States. As would be understood by one of skill in the art, the iSM available from DELL® Inc. provides a lightweight software service that integrates OS features with the iDRAC available from DELL® Inc., and include functionality such as providing OS information to the iDRAC, adding capabilities such as lifecycle log event replication into the operating system log, WINDOWS® Management Instrumentation (WMI) support (including storage), iDRAC Simple Network Management Protocol (SNMP) alerts via the operating system, iDRAC hard reset and remote full power cycle capabilities, automated report collection processes, and other functionality, while producing relatively little impact on the processing system (and a relatively small footprint in the memory system).

The chassis 302 may also house a communication system 312 that is coupled to the operating system engine 306 (e.g., via a coupling between the communication system 312 and the processing system), and that may include a NIC, a wireless communication system (e.g., a BLUETOOTH® communication system, a WiFi communication system, a Near Field Communication (NFC) system, etc.), and/or a variety of other communication components that would be apparent to one of skill in the art in possession of the present disclosure. The communication system 312 includes an in-band network connection 312a to the network 204 that may provide a separate network connection from the out-of-band network connection 310a that is provided for the remote access controller 304. While a specific server device providing the remote access controller support registration system of the present disclosure has been illustrated and described, one of skill in the art in possession of the present disclosure will recognize that remote access controller registration systems according to the teachings of the present disclosure, as well as server devices in the examples provided below, may include a variety of components and/or component configurations for providing conventional functionality, as well as the functionality discussed below, while remaining within the scope of the present disclosure as well.

Figure 4:
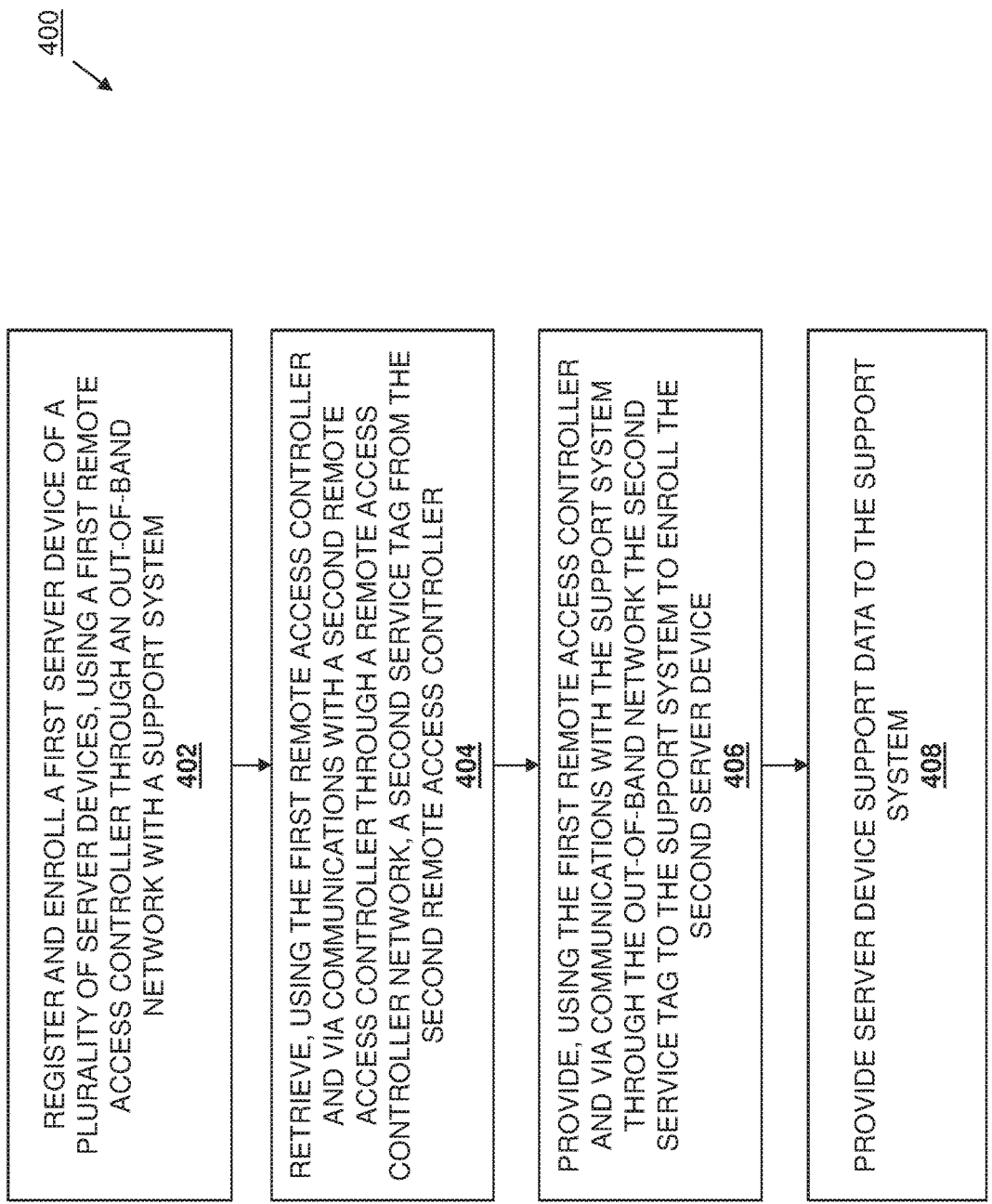
FIG. 4 is a flow chart illustrating an embodiment of a method for providing remote access controller support registration.

Referring now to FIG. 4, an embodiment of a method for registering server devices with a support system using remote access controllers is illustrated. As discussed below, the systems and methods of the present disclosure provide for registration of server devices with a support system using remote access controllers in those server devices, and without the need for each of the server devices to satisfy registration prerequisites (as is required in conventional systems.) For example, once one server device (e.g., of a plurality of server devices that are coupled to each other via a remote access controller network) satisfies registration prerequisites and has its service tag registered and enrolled with the support system via its remote access controller, the remote access controller in that server device may enroll the service tags of any other server device coupled to it via the remote access controller network, irrespective of whether those server devices satisfy the registration prerequisites. For example, the remote access controller in the server device that is registered with the support system may retrieve the service tags of the other server devices via the remote access controller network by using a secure node-to-node protocol that provides for the formation of a cluster of server devices. Once a service tag of a server device (which does not satisfy the registration prerequisites) is enrolled with the support system via the remote access controller in the server device that has satisfied the registration prerequisites, then the support system provides all of the support system features to that server device by communicating directly with the server device through its remote access controller, or through the remote access controller of the server device that has satisfied the prerequisite conditions. As such, the systems and methods of the present disclosure eliminate the need for a server device to satisfy registration prerequisite registration before that server device can receive the benefits of a support system, which produces increased efficiencies and decreased costs associated with the server device registration process.

The method 400 begins at block 402 where a first server device of a plurality of server devices is registered and enrolled with a support system using via its first remote access controller and through an out-of-band network. In an embodiment of block 402, the server devices 202a, 202b, and up to 202c may be provided in a cluster, and the server device 202a may register and enroll with the support system 206 via the remote access controller 304 and through the out-of-band network connection 310a. While the examples herein discuss the server device 202a registering and enrolling with the support system 206 first, one of skill in the art will recognize that either of the server devices 202b or 202c may register and enroll with the support system 206 in place of server device 202a while remaining within the scope of the present disclosure as well. When registering and enrolling with the support system 206, the remote access controller 304 in the server device 202a may provide the support system 206 with a service tag that is associated with the remote access controller 304 in the server device 202a, and that service tag may be used to register and enroll the server device 202a with the support system 206. As would be understood by one of skill in the art in possession of the present disclosure, the service tag may include a unique identifier such as an alphanumeric string (e.g., SVTG123) assigned to the server device by the manufacturer that provides details of shipped inventory and warranty of the server device, helps identify the server device for online support and drivers, and/or any other information that would be apparent to one of skill in the art in possession of the present disclosure.

Prior to the server device 202a registering and enrolling with the support system 206, the server device 202a may be required to satisfy one or more registration prerequisites before the server device 202a can register and enroll with the support system 206. In an embodiment, the registration prerequisites may be predetermined registration prerequisites that the support system 206 requires the server device 202a to satisfy before it will register and enroll the server device 202a with the support system 206. For example, the registration prerequisites may be minimal software requirements, minimal hardware requirements, and/or other minimal component requirements that must be functional in the server device 202a before the server device 202a can communicate with the support system 206. In a specific example, the registration prerequisites may include at least one of a supported operating system installed on the server device 202a, a compatible remote access controller service module (e.g., the service module 306a) installed and running in the operating system engine 306, and/or a network connection with the support system 206 through the network 204 that allows the remote access controller 304 in the server device 202a to communicate via the out-of-band network connection 310a. In an embodiment, the server device 202a may be the first server device of the cluster of server devices 202a-202c to have satisfied all of the registration prerequisites that allow the server device 202a to register and enroll its service tag with the support system 206. As a result, the server device 202a may become a "handler node" for the cluster of server device 202a, 202b, and up to 202c, as one of skill in the art in possession of the present disclosure will recognize from the discussion below.

The method 400 then proceeds to block 404 where the first server device may retrieve, using the first remote access controller and via communications with a second remote access controller in a second server device through a remote access controller network, a second service tag from the second remote access controller. In an embodiment of block 404, the remote access controller 304 of the server device 202a may retrieve, from the remote access controller 304 in either of the server devices 202b and/or 202c and via the remote access controller network connection 310b (which may be coupled to the network 204 or the network 208), the service tag associated with that server device 202b and/or 202c. To retrieve the service tag from the remote access controller of another server device included in the plurality of server devices 202a-202c, the other server devices 202b and/or 202c that are not registered with the support system 206 may need to be powered on such that the remote access controller 304 in that server device 202b and/or 202c is operational and can communicate with the remote access controller 304 in the server device 202a via the remote access controller network connection 310b. The remote access controller 304 does not require that the rest of the server device because it may be powered by flea power, and/or another power source that is separate from the power source powering the server device. As such, the server devices 202b and 202c may not satisfy the registration prerequisites for registering and enrolling with the support system 206 at the time their service tags are retrieved by the server device 202a.

The remote access controller 304 in the server device 202a may retrieve the service tag from the server devices 202b and/or 202c using a node to node communication mechanism that provides for a secure exchange of the service tags. For example, the remote access controller 304 in the server device 202a may use a node to node communication mechanism such as, a distributed file system (DFS) communication mechanism, a remote command execution (RCE) communication mechanism and/or any other node to node communication mechanism that would be apparent to one of skill in the art in possession of the present disclosure to exchange service tags. The server device 202a may then create a cluster within the network 204, and add the remote access controller 304 of the server device 202b and/or 202c to the cluster based on the retrieved service tags.

The method 400 then proceeds to block 406 where the first server device provides, using the first remote access controller and via communications with the support system through the out-of-band network, the second service tag to the support system to enroll the second server device with the support system. In an embodiment of block 406, the server device 202a may provide, using the remote access controller 304 of the server device 202a and via the out-of-band network connection 310a, the service tag of the server device 202b and/or 202c to the support system 206. By providing the service tags of the server devices 202b and/or 202c to the support system 206, the server device 202a may cause the server devices 202b and/or 202c to be enrolled with the support system 206. Specifically, providing the service tag of the server devices 202b and/or 202c to the support system 206 enrolls the remote access controller 304 of the server device 202b and/or 202c with the support system 206.

In an embodiment, the server device 202a may enable any support system features that have been successfully enabled at the support system 206 at the server devices 202b and/or 202c as well. For example, the server device 202a may receive a response from the support system 206 that the server devices 202b and/or 202c (e.g., the remote access controller 304 of those server devices 202b and/or 202c) has been enrolled with the support system 206, and the response may identify support system features that are enabled for the server devices 202b and/or 202c. The server device 202a may use the remote access controller 304 in the server device 202a to communicate through the remote access controller network connection 310b to enable support system features via the remote access controller 304 in the server devices 202b and/or 202c. The support system features that may be enabled for the remote access controller 304 of the server device 202b and/or 202c may include, for example, on demand retrieval of inventory and logs from other remote access controllers and/or any other support system feature that would be apparent to one of skill in the art in possession of the present disclosure. In various embodiments, if an out-of-band network connection 310a is established between the support system 206 and the remote access controller 304 in the server devices 202b and/or 202c, the support system 206 may communicate directly with the remote access controller 304 in the server devices 202b and/or 202c in order to enable support system features based on, for example, the service tag for those server devices 202b and/or 202c (e.g., which may define the support features available for those server devices). In either case, the support system features may be enabled via any remote access controller 304 in any of the server devices 202b and 202c that may not otherwise satisfy the registration prerequisites, which allows those remote access controller 304 in the server devices 202b and 202c to operate as if they are independently registered with the support system 206 and, as such, the support system features may be exercised independently on the remote access controller 304 in the server devices 202b and/or 202c.

The method 400 then proceeds to block 408 where server device support data is provided to the support system. In an embodiment of block 408, the server device 202a may provide, using the remote access controller 304 of the server device 202a and via communications with the support system 206 through the out-of-band network connection 310a, server device support data to the support system 206. The server device support data may include log files about any of the server components 308, the operating system engine 306, the communication system 312, system inventory, configuration data, log files and/or any other server device support data that would be apparent to one of skill in the art in possession of the present disclosure. In an embodiment, the server device support data may be gathered by the service module 306a and/or the remote access controller 304 in the server device 206a. Furthermore, the remote access controller 304 in the server device 206a may receive/retrieve server device support data from the remote access controllers 304 in the server devices 202b and/or 202c (e.g., through the remote access controller network connection 310b, and then provide, via the remote access controller 304 in the server device 202a and through the out-of-band network connection 310a to the support system 206, the server device support data received/retrieved from the server devices 202b and/or 202c. However, in other examples, the server devices 202b and/or 202c may provide their server device support data directly via their remote access controllers 304 and to the support system 206 if, for example, the remote access controller 304 in the server devices 202b and/or 202c has established the out-of-band network connection 310a with the support system 206 via the network 204.

In various embodiments, the remote access controller 304 in the server device 202a, when assigned as the handler node of the cluster of server devices, may gather the server device support data from any of the server devices 202b and/or 202c in the cluster, and/or may cause the server devices 202b and/or 202c to provide their server device support data to the server device 202a and/or the support system 206 via an out-of-band network connection in response to, for example, the occurrence of a collection event on one of the server devices 202a, 202b, and/or 202c. For example, a collection event may occur on any of the server device 202a, 202b, and/or 202c and may include a thermal event, and/or any other collection event that would be apparent to one of skill in the art in possession of the present disclosure, and that collection event may be detected by one of the remote access controllers 304 in the cluster of server devices 202a-c, by one of the service modules 306a in the cluster of server devices 202a-c, and/or by the support system 206. In a specific example, the collection event may include an event where server system support data from more than one of the server devices 202a, 202b, and/or 202c may be useful in diagnosing issues with the cluster of server devices 202a-202c, predicting other errors in the cluster of server devices 202a-202c and/or analyzing other server devices within the cluster, which may result in enhanced issue analysis for server devices in the cluster other than the server device where the collection event occurred.

In various embodiments, the server device 202a may add and remove server devices from the cluster. For example, after registering the service tag for server device 202b, the remote access controller 304 in the server device 202a may discover a connection with the remote access controller 304 in the server device 202c. The remote access controller 304 in the server device 202a may then retrieve the service tag for the remote access controller 304 in the server device 202c through the remote access controller network connection 310b, and provide the service tag for the remote access controller 304 in the server device 202b through the out-of-band network connection 310a and to the support system 206. The remote access controller 304 in the server device 202a may then add the server device 202c to the cluster. In various examples, the remote access controller 304 in the server device 202a may detect, through the remote access controller network connection 310b. that it can no longer detect the remote access controller 304 in the server device 202b and, in response, remove the server device 202b from cluster. In various embodiments, if server device 202a went down, the registration data at the support system 206 would not be lost and once the server device 202a becomes available, the support data flow will resume via the server device 202a.

Thus, systems and methods have been described that provide a remote access controller support registration system for server devices that is more efficient than conventional systems that require each server device in a cluster of server devices to satisfy registration prerequisites before the remote access controllers of those server devices can register with support system. Such efficiencies are realized by registering and enrolling a first remote access controller in a first server device that satisfies the registration prerequisites, and using a remote access controller network connection with other remote access controllers in other server devices to gather service tags for those other remote access controllers, and provide those service tags to the support system enroll those other server devices with the support system without the need for those server devices to satisfy registration prerequisites. The first remote access controller may then enable any support system features at the other server devices. The first remote access controller may then collect server device support data from the other server devices and provide that server device support data to the support system. As such, server devices may act as if they were independently registered with the support system, and their support system features may be exercised independently and without the need to satisfy the registration prerequisites and individually register with the support system, as is required in conventional remote access controller support registration systems.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:
1. A remote access controller support system, comprising:
a support system;
a first server device that includes a first remote access controller;
a second server device that includes a second remote access controller, wherein the second remote access controller is coupled to the support system through an out-of-band network and coupled to the first remote access controller through a remote access controller network, and wherein the second server device is configured to:
  register and enroll, using the second remote access controller and via communications with the support system through the out-of-band network, the second remote access controller with the support system by providing the support system with a second remote access controller service tag;
  retrieve, using the second remote access controller and via communications with the first remote access controller through the remote access controller network, a first remote access controller service tag from the first remote access controller, wherein the first server device does not satisfy a registration prerequisite such that the first server device cannot use the first remote access controller and perform communications with the support system through the out-of-band network to register and enroll the first remote access controller with the support system by providing the support system with the first remote access controller service tag; and provide, using the second remote access controller and via communications with the support system through the out-of-band network, the first remote access controller service tag to the support system to enroll the first remote access controller with the support system.

2. The system of claim 1, wherein the second server device is configured to:
determine, prior to the registering of the second remote access controller with the support system, that the second remote access controller has satisfied at least one registration prerequisite.

3. The system of claim 2, wherein the at least one registration prerequisite includes a supported operating system installed on the second server device, a remote access controller service module running on the supported operating system, and the second remote access controller being coupled to the support system through the out-of-band network.

4. The system of claim 1, wherein the second server device is configured to:
provide, via the second remote access controller and through the out-of-band network to the support system, second server device support data.

5. The system of claim 1, wherein the second server device is configured to:
retrieve, from the first remote access controller and through the remote access controller network, first server device support data; and
provide, via the second remote access controller and through the out-of-band network to the support system, the first server device support data.

6. The system of claim 1, wherein the first server device is configured to:
provide, via the first remote access controller and through the out-of-band network to the support system, first server device support data when the first remote access controller is coupled to the out-of-band network.

7. The system of claim 1, wherein the second server device is configured to:
create a local cluster that includes the first remote access controller and the second remote access controller;
detect a third remote access controller being coupled to the second remote access controller via the remote access controller network;
add the third remote access controller to the local cluster;
retrieve, via communications with the third remote access controller through the remote access controller network, a third remote access controller service tag; and
provide, using the second remote access controller and via communications with the support system through the out-of-band network, the third remote access controller service tag to the support system to enroll the third remote access controller with the support system.

8. The system of claim 7, wherein the second server device is configured to:
provide, in response to a support data collection event detected at least one of the second remote access controller and the third remote access controller that belong to the local cluster, second server device support data to the support system.

9. An information handling system (IHS), comprising:
a first remote access controller, wherein the first remote access controller is coupled to a support system through an out-of-band network connection and coupled to a second remote access controller that is housed by a server device through a remote access controller network connection, and wherein the first remote access controller is configured to:
register and enroll, via communications with the support system through the out-of-band network connection, the first remote access controller with the support system by providing the support system with a first service tag;
retrieve, via communications with the second remote access controller through the remote access controller network connection, a second service tag from the second remote access controller, wherein the second remote access controller does not satisfy a registration prerequisite such that the server device cannot use the second remote access controller and perform communications with the support system through the out-of-band network connection to register and enroll the second remote access controller with the support system by providing the support system with the second service tag; and
provide, via communications with the support system through the out-of-band network connection, the second service tag to the support system to enroll the second remote access controller with the support system.

10. The IHS of claim 9, wherein the first remote access controller is configured to:
determine, prior to the registering of the first remote access controller with the support system, that the first remote access controller has satisfied at least one registration prerequisite.

11. The IHS of claim 10, wherein the at least one registration prerequisite includes a supported operating system coupled to the first remote access controller, a remote access controller service module running on the supported operating system, and the first remote access controller being coupled to the support system through the out-of-band network connection.

12. The IHS of claim 9, wherein the first remote access controller is configured to:
provide, through the out-of-band network connection to the support system, first server device support data.

13. The IHS of claim 9, wherein the first remote access controller is configured to:
retrieve, from the second remote access controller and through the remote access controller network connection, second server device support data; and
provide, through the out-of-band network connection to the support system, the second server device support data.

14. The IHS of claim 9, wherein the first remote access controller is configured to:
create a local cluster that includes the first remote access controller and the second remote access controller;
detect a third remote access controller being coupled to the first remote access controller via the remote access controller network connection;
add the third remote access controller to the local cluster;
retrieve, via communications with the third remote access controller through the remote access controller network connection, a third service tag; and
provide, via communications with the support system through the out-of-band network connection, the third service tag to the support system to enroll the third remote access controller with the support system.

15. A method of registering a remote access controller of a server device with a support system, comprising:

registering and enrolling, using a first remote access controller and via communications with a support system through an out-of-band network connection, the first remote access controller with the support system by providing the support system with a first service tag;

retrieving, using the first remote access controller and via communications with a second remote access controller through a remote access controller network connection, a second service tag from the second remote access controller, wherein the second remote access controller does not satisfy a registration prerequisite such that the second remote access controller cannot perform communications with the support system through the out-of-band network connection to register and enroll the second remote access controller with the support system by providing the support system with the second service tag; and providing, using the first remote access controller and via communications with the support system through the out-of-band network connection, the second service tag to the support system to enroll the second remote access controller with the support system.

16. The method of claim 15, further comprising:
determining, prior to the registering of the first remote access controller with the support system, that the first remote access controller has satisfied at least one registration prerequisite.

17. The method of claim 15, further comprising:
providing, using the first remote access controller and through the out-of-band network connection to the support system, first server device support data.

18. The method of claim 15, further comprising:
retrieving, using the first remote access controller and from the second remote access controller and through the remote access controller network connection, second server device support data; and
providing, using the first remote access controller and through the out-of-band network connection to the support system, the second server device support data.

* * * * *